(12) United States Patent
Ueda et al.

(10) Patent No.: US 11,212,359 B2
(45) Date of Patent: Dec. 28, 2021

(54) TRANSFER APPARATUS FOR CONTENT DISTRIBUTION NETWORK

(71) Applicant: KDDI CORPORATION, Tokyo (JP)

(72) Inventors: Kazuaki Ueda, Fujimino (JP); Atsushi Tagami, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 17/071,626

(22) Filed: Oct. 15, 2020

(65) Prior Publication Data

US 2021/0029212 A1   Jan. 28, 2021

Related U.S. Application Data

(63) Continuation of application No. PCT/JP2019/027952, filed on Jul. 16, 2019.

(30) Foreign Application Priority Data

Aug. 8, 2018 (JP) .............................. JP2018-149307

(51) Int. Cl.
  *G06F 15/167* (2006.01)
  *H04L 29/08* (2006.01)
(52) U.S. Cl.
  CPC .......... *H04L 67/2842* (2013.01); *H04L 67/10* (2013.01)
(58) Field of Classification Search
  CPC ............................ H04L 67/2842; H04L 67/10
  See application file for complete search history.

(56) References Cited

U.S. PATENT DOCUMENTS

| 8,386,622 B2 | 2/2013 | Jacobson |
| 2013/0185406 A1 | 7/2013 | Choi et al. |
| 2015/0039754 A1 | 2/2015 | Gupta et al. |

(Continued)

FOREIGN PATENT DOCUMENTS

| JP | 2009-277234 A | 11/2009 |
| JP | 2011-034361 A | 2/2011 |

(Continued)

OTHER PUBLICATIONS

Jacobson, et al., "Networking Named Content", in Proceedings of ACM CoNEXT 2009, Dec. 2009, 12 pages.

(Continued)

*Primary Examiner* — Hua Fan
(74) *Attorney, Agent, or Firm* — Foley & Lardner LLP

(57) ABSTRACT

A transfer apparatus for a content distribution network in which a content is divided into one or more objects and distributed includes: a determination unit configured to, upon receiving a first request packet, determine whether the first request packet is to be processed; a monitor unit configured to, when the first request packet is to be processed, determine a requested content corresponding to a requested object requested by the first request packet, and monitor a second request packet that requests an object of the requested content for a predetermined period; and a transmission unit configured to, when the second request packet satisfies a predetermined condition, generate and transmit a third request packet that requests an object that differs from the objects requested by the first request packet and the second request packet among objects of the requested content.

11 Claims, 5 Drawing Sheets

(56) References Cited

U.S. PATENT DOCUMENTS

2016/0330287 A1* 11/2016 Smith ................. H04L 12/2812
2017/0054800 A1*  2/2017 DiVincenzo ....... H04N 21/2187
2017/0373975 A1   12/2017 Moiseenko et al.

FOREIGN PATENT DOCUMENTS

| JP | 2015-170323 A | 9/2015 |
| JP | 2016-149714 A | 8/2016 |
| JP | 2017-037411 A | 2/2017 |
| JP | 2017-134850 A | 8/2017 |

OTHER PUBLICATIONS

Schneider, et al., "A Practical Congestion Control Scheme for Named Data Networking", ACM ICN, 2016, 10 pages.
Carofiglio, et al., "Optimal multipath congestion control and request forwarding in information-centric networks: Protocol design and experimentation", Computer Networks 110 (2016): 104-117, 2016, 14 pages.
Office Action issued in corresponding Japanese Patent Application No. 2018-149307 dated Aug. 27, 2021 with English translation.
Extended European Search Report issued in corresponding European Patent Application No. 19846294.7 dated Sep. 15, 2021.

* cited by examiner

TRANSFER APPARATUS FOR CONTENT DISTRIBUTION NETWORK

CROSS-REFERENCE TO RELATED APPLICATION(S)

This application is a continuation of International Patent Application No. PCT/JP2019/027952 filed on Jul. 16, 2019, which claims priority to and the benefit of Japanese Patent Application No. 2018-149307 filed on Aug. 8, 2018, the entire disclosures of which are incorporated herein by reference.

TECHNICAL FIELD

The present invention relates to a transfer apparatus for a content distribution network in which a content is divided into one or more objects and distributed.

BACKGROUND ART

Networks that distribute contents based on the names that indicate the contents have been proposed. Japanese Patent Laid-Open No. 2009-277234 and V Jacobson, et al., "Networking Named Content", in Proceedings of ACM CoNEXT 2009, December, 2009 disclose Content Centric Networking (CCN), which is one of such networks.

In CCN, a server apparatus that releases a content divides the content into one or more objects called chunks, and a client apparatus obtains the content in units of these divided objects. Furthermore, in CCN, a communication apparatus that has transferred objects (hereinafter referred to as a transfer apparatus) can hold (cache) the objects. When this transfer apparatus receives, from a client apparatus, interest packets (request packets) that request the objects cached in this transfer apparatus, this transfer apparatus can transmit data packets including the objects held in this transfer apparatus to the client apparatus that transmitted the interest packets without transferring the interest packets toward a server apparatus.

Examples of the operations of the transfer apparatus will be described below. The transfer apparatus manages CS (Contents Store), FIB (Forwarding Information Base), and PIT (Pending Interest Table). The CS is information that indicates the objects cached in the transfer apparatus. The FIB is information that indicates a relationship between interest packets and interfaces that should transfer the interest packets. The PIT is information that indicates a relationship between the objects requested by transferred interest packets and interfaces that have received the transferred interest packets.

Upon receiving interest packets, the transfer apparatus searches the CS and determines whether the objects requested by the interest packets have been cached. If the objects have been cached, the transfer apparatus transmits data packets including the objects cached in this transfer apparatus to a client apparatus that transmitted the interest packets. On the other hand, if the objects requested by the received interest packets have not been cached, the transfer apparatus searches the PIT and determines whether interest packets that request the same objects as the received interest packets have already been transferred and the reception of the objects is pending. If the reception is pending, the received interest packets are not transferred, and the PIT is updated so as to associate a reception interface for the received interest packets with the objects requested by the received interest packets. On, the other hand, if the reception of the objects requested by the received interest packets is not pending, the received interest packets are transferred from an interface that has been determined based on the FIB, and the PIT is updated. Also, when the transfer apparatus has received data packets including objects, it determines an interface that serves as a transfer destination of the data packets based on the PIT and the objects included in the data packets, transfers the data packets from the determined interface, and deletes information related to the objects from the PIT. Furthermore, the transfer apparatus updates the CS when the objects included in the transferred data packets have been cached.

In CCN, a client apparatus transmits interest packets indicating objects, and obtains the objects in response. Therefore, in order to obtain a content, a large number of interest packets are transmitted; this causes congestion in a content distribution network. In view of this, Schneider, Klaus, et al., "A practical congestion control scheme for named data networking", ACM ICN, 2016 and Carofiglio, Giovanna, et al., "Optimal multipath congestion control and request forwarding in information-centric networks: Protocol design and experimentation", Computer Networks 110 (2016): 104-117, 2016 disclose congestion control methods in CCN.

SUMMARY OF INVENTION

The configurations described in Schneider, Klaus, et al., "A practical congestion control scheme for named data networking", ACM ICN, 2016 and Carofiglio, Giovanna, et al., "Optimal multipath congestion control and request forwarding in information-centric networks: Protocol design and experimentation", Computer Networks 110 (2016): 104-117, 2016 control the number of interest packets that can be transmitted continuously from a client apparatus (hereinafter, a window size) based on received data packets. Specifically, the client apparatus increases the window size if data packets corresponding to the transmitted interest packets are received within a predetermined period and reduces the window size if the data packets are not received within the predetermined period. However, if there is a large amount of delay from the client apparatus to a server apparatus or a transfer apparatus that holds objects, the speed at which the client apparatus increases the window size becomes slow, and a period required to download a content increases.

According to an aspect of the present invention, a transfer apparatus for a content distribution network in which a content is divided into one or more objects and distributed includes: a determination unit configured to, upon receiving a first request packet, determine whether the first request packet is to be processed; a monitor unit configured to, when the first request packet is to be processed, determine a requested content corresponding to a requested object that is requested by the first request packet, and monitor a second request packet that requests an object of the requested content for a predetermined period; and a transmission unit configured to, when the second request packet satisfies a predetermined condition, generate and transmit a third request packet that requests an object that differs from the objects requested by the first request packet and the second request packet among objects of the requested content.

Other features and advantages of the present invention will be apparent from the following description taken in conjunction with the accompanying drawings. Note that the same reference numerals denote the same or like components throughout the accompanying drawings.

DESCRIPTION OF EMBODIMENTS

Hereinafter, an exemplary embodiment of the present invention will be described with reference to the drawings. Note that in each of the drawings described below, constituent elements that are not necessary for the description of the embodiment are omitted. Furthermore, the embodiment described below is exemplary, and the present invention is not limited to the content of the embodiment.

Figure 1:
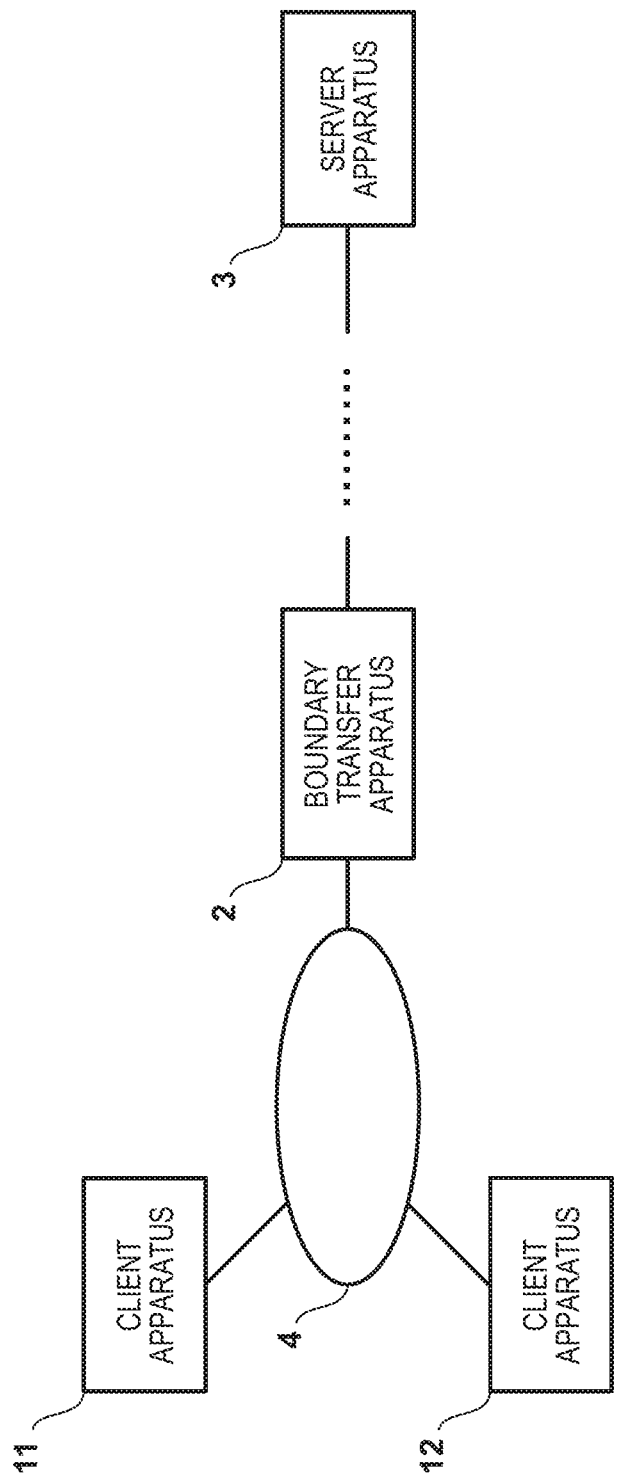
FIG. 1 is a configuration diagram of a content distribution network according to an embodiment.

FIG. 1 is a configuration diagram of a content distribution network according to the present embodiment. Below, the present embodiment will be described under the assumption that the content distribution network is CCN. However, the present invention is applicable to any content distribution network in which a content is divided into one or more objects, the content is distributed in units of divided objects, and a transfer apparatus that has transferred the content can cache the objects.

As shown in FIG. 1, the content distribution network includes a server apparatus 3 that releases a content, client apparatuses 11 and 12 that obtain the content in accordance with CCN, and a boundary transfer apparatus 2. The client apparatuses 11 and 12 and the boundary transfer apparatus 2 are connected to a local network 4 that is composed of normal transfer apparatuses according to the aforementioned CCN. In FIG. 1, the client apparatuses 11 and 12, the boundary transfer apparatus 2, and the local network 4 are arranged in Japan. On the other hand, the server apparatus 3 is arranged outside Japan, specifically in the United Kingdom according to the present embodiment. Note that the boundary transfer apparatus 2 and the server apparatus 3 are configured to be capable of communicating via a global network that is composed of normal transfer apparatuses and the boundary transfer apparatus 2 according to the present embodiment. Furthermore, although the content distribution network also includes server apparatuses arranged in Japan, they are not relevant to the description of the present embodiment and are hence omitted. In addition, although the content distribution network also includes server apparatuses arranged in various countries other than Japan in addition to the server apparatus 3, they are omitted to simplify the description.

In the present embodiment, the FIB of transfer apparatuses in the local network 4 is set so that, when client apparatuses arranged in Japan, such as the client apparatuses 11 and 12, are to obtain a content released by a server apparatus arranged in a country other than Japan, such as the server apparatus 3, interest packets transmitted by the client apparatuses in Japan are transferred to the boundary transfer apparatus 2. Although it is assumed in the present embodiment that only one boundary transfer apparatus 2 is arranged in Japan to simplify the description, it is also possible to adopt a configuration in which a plurality of boundary transfer apparatuses 2 are arranged in Japan. For example, it is possible to adopt a configuration in which boundary transfer apparatuses 2 are arranged in Tokyo and Osaka, and the FIB of transfer apparatuses in the local network 4 is set so that, among interest packets that request a content released by the server apparatus 3, interest packets transmitted by a client apparatus in eastern Japan are transferred to the boundary transfer apparatus 2 in Tokyo, whereas interest packets transmitted by a client apparatus in western Japan are transferred to the boundary transfer apparatus 2 in Osaka.

The client apparatuses 11 and 12 manage the window size W and the number U of interest packets which have been transmitted and for which data packets have not been received in response. The window size W defines the maximum allowable value of the number U. For example, when the window size W=4, the client apparatuses 11 and 12 can continuously transmit up to four interest packets. Then, once the four interest packets have been transmitted, the client apparatuses 11 and 12 cannot transmit new interest packets until they receive data packets in response to one or more of the four interest packets. Also, upon receiving a data packet in response to one of the four interest packets, the client apparatuses 11 and 12 can newly transmit one interest packet.

Furthermore, the client apparatuses 11 and 12 increase or decrease the window size W depending on whether data packets have been received within a predetermined period in response to transmitted interest packets. For example, assume that the initial value of the window size W is four. In this case, after transmitting four interest packets, if the client apparatuses 11 and 12 receive data packets corresponding to all of the four interest packets within the predetermined period, the window size W is increased twofold, that is to say, changed to eight. As the window size W=8, the client apparatuses 11 and 12 can continuously transmit eight interest packets. After transmitting eight interest packets, if the client apparatuses 11 and 12 receive data packets corresponding to all of the eight interest packets within the predetermined period, the window size W is increased twofold, that is to say, changed to sixteen. In this way, in the present embodiment, it is assumed that the client apparatuses 11 and 12 increase the window size W twofold if they receive all of the responses to transmitted interest packets within the predetermined period. That is to say, when the client apparatuses 11 and 12 have received the responses to transmitted interest packets within the predetermined period due to a small amount of traffic in the content distribution network, they can increase the window size W to 4, 8, 16, 32, 64, 128, 256, and so on. On the other hand, it is assumed that when the client apparatuses 11 and 12 do not receive at least one response to transmitted interest packets within the predetermined period, they reduce the window size W by half. By thus gradually increasing the window size W in a stepwise manner, the amount of interest packets that are appropriately transmitted in accordance with the traffic status of the content distribution network can be controlled. Although there are a variety of control methods for the window size W other than the above-described method, the present invention can be applied irrespective of the specific contents of the control method for the window size used in the client apparatuses 11 and 12.

For example, assume that the client apparatus 11 obtains a certain content from the server apparatus 3. Here, it is assumed that none of transfer apparatuses (including the boundary transfer apparatus 2) between the client apparatus 11 and the server apparatus 3 have cached the objects of this content. That is to say, it is assumed that all interest packets which are transmitted by the client apparatus 11 and which request the objects of this content are transferred to the server apparatus 3, and all of the objects are distributed from the server apparatus 3. It is also assumed that the capacity of all links from the client apparatus 11 to the server apparatus 3 are sufficiently large, and the amount of traffic in all links from the client apparatus 11 to the server apparatus 3 is sufficiently small. In this case, although the client apparatus 11 can sequentially increase the window size W, due to the long distance between Japan and the United Kingdom, the round-trip time (RTT) is approximately 200 ms even if there is no congestion in links between the client apparatus 11 and the server apparatus 3. That is to say, the client apparatus 11 can only increase the window size W approximately every 200 ms. Such a long RTT extends a period until the window size W is increased to the size corresponding to a possible throughput with respect to the server apparatus 3, and extends a period required to obtain the content. Note that should the server apparatus 3 be arranged in Japan, the RTT is approximately several ins to several tens of ms, and the client apparatus 11 can increase the window size W to the size corresponding to a possible throughput with respect to the server apparatus 3 within a short period.

In the present embodiment, when a client apparatus obtains a content from the server apparatus 3 with the long RTT via the boundary transfer apparatus 2, the window size W of the client apparatus is increased within a short period, thereby reducing the period of downloading the content performed by the client apparatus.

Figure 2:
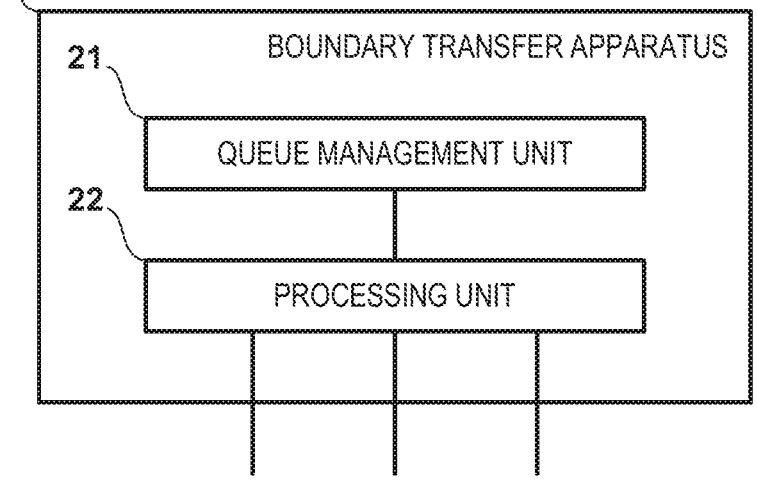
FIG. 2 is a configuration diagram of a boundary transfer apparatus according to an embodiment.

FIG. 2 is a configuration diagram of the boundary transfer apparatus 2. A processing unit 22 includes a plurality of interfaces, and basically performs the same operations as a normal transfer apparatus. That is to say, the processing unit 22 manages FIB, PIT, and CS, and transfers interest packets and data packets. Also, when it has received and transferred data packets, it caches the objects stored in the data packets in accordance with predetermined criteria. In transferring certain interest packets, the processing unit 22 determines whether to transfer these interest packets to a queue management unit 21 as well based on the object names of the objects requested by these interest packets, in addition to performing the same operations as a normal transfer apparatus. Note that when interest packets are transmitted to the queue management unit 21, these interest packets are not transmitted only to the queue management unit 21; instead, these interest packets are transferred from an interface that is determined based on the FIB, and at the same time, the same interest packets are transmitted to the queue management unit 21.

In the present embodiment, it is assumed that an object name has a hierarchical structure, and the top level of this hierarchical structure indicates a country name. For example, the name of a content released by a server apparatus in Japan starts with jp indicating Japan, and the object name of an object with an object number 1 in a content named "contentsA" is, for example, "/jp/ . . . /contentsA/1", Similarly, the name of a content released by the server apparatus 3 in the United Kingdom starts with uk indicating the United Kingdom, and the object name of an object with an object number 1 in a content named "contentsA" is, for example, "/uk/ . . . /contentsA/1" It is also assumed that a content with a size equal to or smaller than the maximum allowable size of one object, such as an html file, has a content name that is equal to an object name. For example, it is assumed that with regard to a content named "/uk/ . . . /AAA.html" released by the server apparatus 3 in the United Kingdom, an object name is also "% uk/ . . . /AAA.html". Among interest packets to be transferred, the processing unit 22 transmits an interest packet to the queue management unit 21 when an interest packet requests an object name which indicates a country other than Japan and has an object number. In other words, an interest packet requesting one object of a content released in another country that is divided into a plurality of objects is transmitted to the queue management unit 21 as it requires a high-speed processing.

Figure 3:
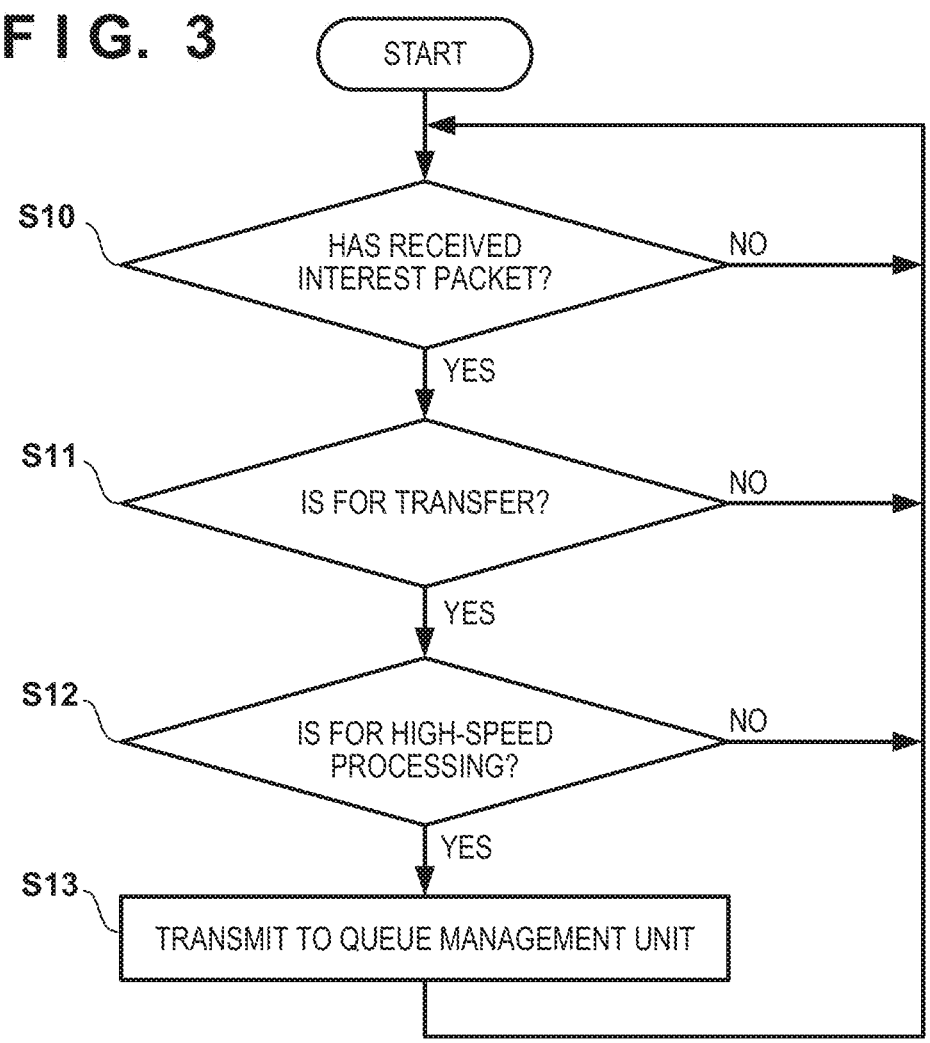
FIG. 3 is a flowchart of processing in a processing unit according to an embodiment.

FIG. 3 is a processing flow at the time of reception of an interest packet in the processing unit 22. In S10, the processing unit 22 stands by until an interest packet is received. Upon receiving an interest packet, the processing unit 22 determines whether this interest packet should be transferred based on the FIB in S11. For example, in the case of reception of an interest packet that requests a cached object or an interest packet that requests an object indicated by the PIT, S11 leads to No. When the interest packet should not be transferred based on the FIB, the processing unit 22 repeats processing from S10. On the other hand, when the interest packet should be transferred based on the FIB, the processing unit 22 determines whether the interest packet is to undergo high-speed processing in S12, Whether the interest packet is to undergo high-speed processing is determined based on the object name of the object requested by the interest packet in the above-described manner. When the interest packet is not to undergo high-speed processing, the processing unit 22 repeats processing from S10. On the other hand, when the interest packet is to undergo high-speed processing, the processing unit 22 transmits the interest packet to the queue management unit 21 in S13. Note that the processing unit 22 perform the same processing as a normal transfer apparatus with respect to the interest packet, in addition to processing shown in FIG. 3.

Figure 4:
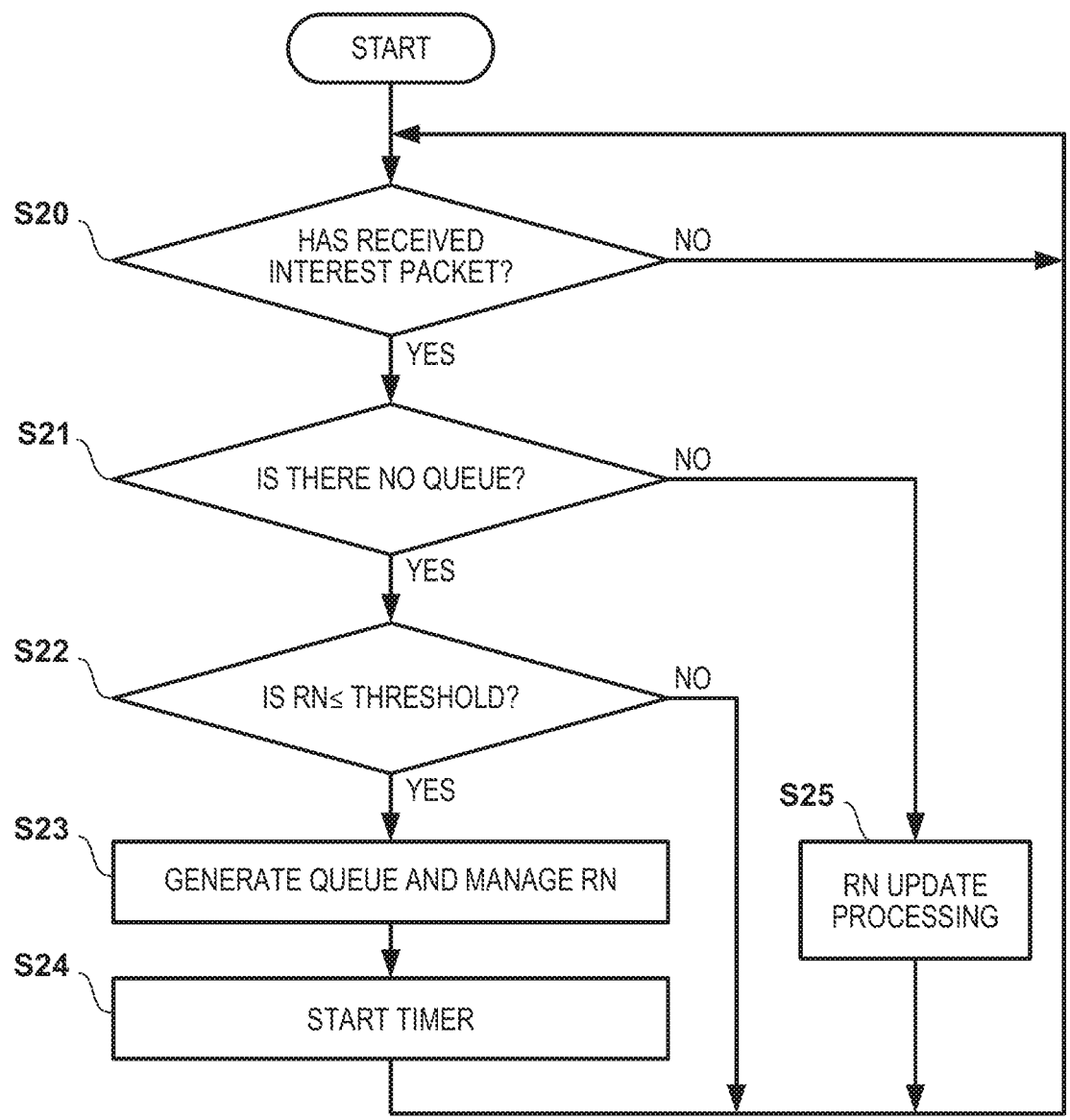
FIG. 4 is a flowchart of queue management processing in a queue management unit according to an embodiment.

FIG. 4 is a flowchart of queue management processing in the queue management unit 21. In S20, the queue management unit 21 stands by until an interest packet is received from the processing unit 22. Upon receiving an interest packet from the processing unit 22, the queue management unit 21 manages whether there is a queue corresponding to a content of an object requested by the received interest packet in S21. When there is no queue corresponding to the content of the object requested by the interest packet, the queue management unit 21 determines whether the object number of the object requested by this interest packet (hereinafter referred to as RN) is equal to or smaller than a threshold in S22. When the RN is larger than the threshold, the queue management unit 21 repeats processing from S20, On the other hand, when the RN is equal to or smaller than the threshold, the queue management unit 21 generates a queue corresponding to this content and stores the RN in correspondence with the queue in S23. Then, in S24, the queue management unit 21 starts counting of a timer corresponding to the generated queue.

On the other hand, when there is a queue corresponding to the content of the object requested by the interest packet in S21, the queue management unit 21 determines whether the object number of the requested object of the received interest packet is larger than the RN corresponding to the queue of this content in S25. When the object number of the requested object of the received interest packet is larger than the RN corresponding to the queue of this content, the queue management unit 21 updates the RN corresponding to the queue of this content to the object number of the requested object of the received interest packet. On the other hand, when the object number of the requested object of the received interest packet, is equal to or smaller than the RN corresponding to the queue of this content, the queue management unit 21 does not change the RN corresponding to the queue of this content.

Figure 5:
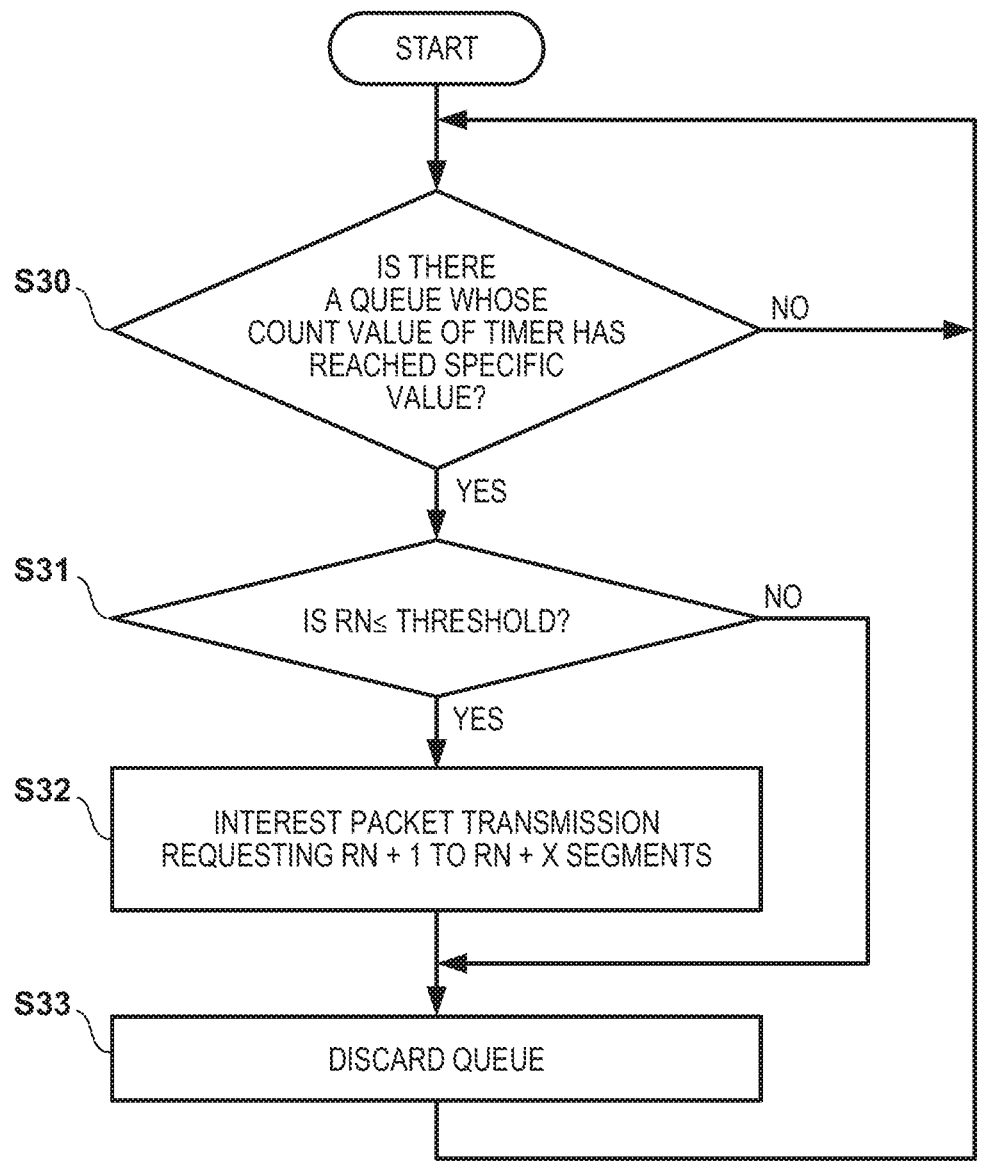
FIG. 5 is a flowchart of interest packet generation processing in the queue management unit according to an embodiment.

FIG. 5 is a flowchart of interest packet transmission processing in the queue management unit 21. In S30, the queue management unit 21 determines whether there is a queue for which a count value of a timer has reached a predetermined value. When there is no queue for which a count value of a timer has reached the predetermined value, the queue management unit 21 repeats processing from S30. When there is a queue for which a count value of a timer has reached the predetermined value, the queue management unit 21 determines whether the value of the RN corresponding to this queue is equal to or smaller than a threshold in S31. Note that in the present embodiment, it is assumed that the threshold used in S31 is the same as the threshold used in S22 of FIG. 4. However, the threshold used in S31 and the threshold used in S22 of FIG. 4 can have different values. When the value of the RN corresponding to the queue is larger than the threshold, the queue management unit 21 discards this queue in S33, and repeats processing from S30. On the other hand, when the value of the RN corresponding to the queue is equal to or smaller than the threshold, the queue management unit 21 generates interest packets that request objects which belong to the content corresponding to this queue and which have object numbers from a value that is larger by one than the value of the RN corresponding to this queue to a value that is larger by a predetermined value X than the value of the RN corresponding to this queue, and transmits the generated interest packets to the processing unit 22. Thereafter, the queue management unit 21 discards this queue in S33, and repeats processing from S30.

Note that with respect to an interest packet received from the queue management unit 21, the processing unit 22 only performs the same processing as a normal transfer apparatus, and does not perform the processing that has been described using FIG. 3. Also, with respect to an object (data packet) that has been received in response to an interest packet received from the client apparatus 1, the processing unit 22 performs the same transfer processing as a normal transfer apparatus. On the other hand, with respect to an object that has been received in response to an interest packet received from the queue management unit 21, the processing unit 22 caches the object and does not transfer the object to the queue management unit 21. Note that when there is no capacity to cache all of the objects that have been received in response to interest packets received from the queue management unit 21, the objects are preferentially cached in ascending order of the period since the objects were received.

The following describes a case where the client apparatus 11 obtains a content with a content name "uk/aaa/videoA.mp4". It is assumed that this content has been divided into 10000 objects, and their object names are "uk/aaa/videoA.mp4/1" to "uk/aaa/videoAmp4/10000". It is also assumed that the client apparatus 11 has never obtained contents before, and the window size W starts from a small initial value, for example, 4. Furthermore, it is assumed that a threshold held in the queue management unit 21 is 300, and a predetermined value X is 150. Moreover, it is assumed that in the initial state, all transfer apparatuses that exist between the client apparatus 11 and the server apparatus 3 have cached none of the objects of "uk/aaa/videoA.mp4".

As the window size W=4, the client apparatus 11 continuously transmits four interest packets that request "uk/aaa/videoA.mp4/1" to "uk/aaa/videoA.mp4/4". Each interest packet is to be transferred and is to undergo high-speed processing by the boundary transfer apparatus 2 (S11 and S12 of FIG. 3) and is thus transmitted to the queue management unit 21.

As no queue is managed in the queue management unit 21, upon receiving the interest packet that requests "uk/aaa/videoA.mp4/1", which is the object with an object number smaller than the threshold, the queue management unit 21 generates a queue and holds RN=1 in correspondence with this queue in S23 of FIG. 4, and starts counting of a timer corresponding to this queue in S24 of FIG. 4. Subsequently, upon receiving the interest packet that requests "uk/aaa/videoA.mp4/2", the queue management unit 21 updates the RN corresponding to the queue of the content "uk/aaa/videoA.mp4" to 2 in S25 of FIG. 4. Similarly, with the reception of the interest packets that request "uk/aaa/videoA.mp4/3" and "uk/aaa/videoA.mp4/4", the RN corresponding to the queue of the content "uk/aaa/videoA.mp4" is updated to 4.

When a count value of the timer for the queue corresponding to the content "uk/aaa/videoA.mp4" has reached the predetermined value (S30 of FIG. 5), the queue management unit 21 determines whether the RN corresponding to this queue is equal to or smaller than the threshold of 300 in S31. In the present example, the RN is 4, which is equal to or smaller than the threshold of 300; thus, in S32, the queue management unit 21 generates interest packets that request objects with object numbers 5 to 154 of the content "uk/aaa/videoA.mp4", and transmits them to the processing unit 22. That is to say, the queue management unit 21 generates interest packets that request "uk/aaa/videoA.mp4/5" to "uk/aaa/videoA.mp4/154" and transmits them to the processing unit 22.

In this way, the interest packets that request "uk/aaa/videoA.mp4/1" to "uk/aaa/videoA.mp4/154" have been transmitted from the boundary transfer apparatus 2 toward the server apparatus 3. Note that among these, "uk/aaa/videoA.mp4/1" to "uk/aaa/videoA.mp4/4" have been transmitted by the client apparatus 11, and the boundary transfer apparatus 2 transfers data packets that are received in response to these interest packets in a normal way. On the other hand, as the interest packets that request "uk/aaa/videoA.mp4/5" to "uk/aaa/videoA.mp4/154" have been generated by the queue management unit 21, the processing unit 22 caches "uk/aaa/videoA.mp4/4" to "uk/aaa/videoA.mp4/154" that are received in response to these interest packets.

Upon receiving "uk/aaa/videoA.mp4/1" to "uk/aaa/videoA.mp4/4", the client apparatus 11 increases the window size W twofold, that is to say, to 8, and transmits interest packets that request "uk/aaa/videoA.mp4/5" to "uk/aaa/videoA.mp4/12"; as they have been cached in the boundary transfer apparatus 2, the boundary transfer apparatus 2 can immediately transmit these objects to the client apparatus 11. Then, the client apparatus 11 increases the window size W twofold, that is to say, to 16, and transmits interest packets that request "uk/aaa/videoA.mp4/13" to "uk/aaa/videoA.mp4/28": as they have been cached in the boundary transfer apparatus 2, the boundary transfer apparatus 2 can immediately transmit these objects to the client apparatus 11.

Thereafter, when the client apparatus 11 transmits an interest packet that requests "uk/aaa/videoA.mp4/155", the boundary transfer apparatus 2 newly generates a queue corresponding to the content "uk/aaa/videoA.mp4". For example, when the window size W of the client apparatus 11 is 128 at this time, the queue management unit 21 receives interest packets that request up to "uk/aaa/videoA.mp4/252" until a count value of a timer corresponding to the newly generated queue reaches the predetermined value. Therefore, the boundary transfer apparatus 2 generates and transmits interest packets that request "uk/aaa/videoA.mp4/253" to "uk/aaa/videoA.mp4/402" in S32 of FIG. 5. Thus, the boundary transfer apparatus 2 can obtain in advance and cache "uk/aaa/videoA.mp4/253" to "uk/aaa/videoA.mp4/402", and the client apparatus 11 can obtain "uk/aaa/videoA.mp4/253" to "uk/aaa/videoA.mp4/402" within a short period.

In the above-described manner, when the window size W is smaller than the threshold, the boundary transfer apparatus 2 obtains in advance and caches the content that the client apparatus 11 is attempting to obtain: consequently, the window size W of the client apparatus 11 can be increased promptly, and hence the period of downloading the content performed by the client apparatus 11 can be reduced. Note that when the client apparatus 11 thereafter transmits an interest packet that requests "uk/aaa/videoA.mp4/403", S22 of FIG. 4 leads to No, and no queue is generated.

Next, a description is given of a case where the client apparatus 11 obtains a content with a content name "uk/aaa/video.html". As the size of this content is equal to or smaller than the maximum data amount of one object, an object name is equal to the content name, and there is no object number. In this case, although the client apparatus 11 transmits an interest packet that requests "uk/aaa/video.html", this interest packet is not to undergo high-speed processing in the boundary transfer apparatus 2 due to the absence of the object number (S12 of FIG. 3), and thus this interest packet is not transmitted to the queue management unit 21.

Next, a description is given of a case where the client apparatus 12 obtains a content with a content name "uk/aaa/videoB.mp4". It is assumed that this content has been divided into 10000 objects, and their object names are "uk/aaa/videoB.mp4/1" to "uk/aaa/videoB.mp4/10000". It is also assumed that the client apparatus 12 has obtained other contents previously, and the window size W is a value corresponding to the throughput in previous obtainment of contents, for example, 1024. Furthermore, it is assumed that a threshold held in the queue management unit 21 is 300, and a predetermined value X is 150. Moreover, it is assumed that in the initial state, all transfer apparatuses that exist between the client apparatus 12 and the server apparatus 3 have cached none of the objects of "uk/aaa/videoB.mp4".

As the window size W=1024, the client apparatus 12 continuously transmits 1024 interest packets that request "uk/aaa/videoB.mp4/1" to "uk/aaa/videoB.mp4/1024". Each interest packet is to be transferred and is to undergo high-speed processing by the boundary transfer apparatus 2 and is thus transmitted to the queue management unit 21. Upon receiving the interest packet that requests "uk/aaa/videoB.mp4/1", the queue management unit 21 generates a queue and records RN=1 in correspondence with this queue in S23 of FIG. 4, and starts counting of a timer corresponding to this queue in S24 of FIG. 4. Next, upon receiving the interest packet that requests "uk/aaa/videoB.mp412", the queue management unit 21 updates the RN corresponding to the queue of the content "uk/aaa/videoB.mp4" to 2 in S25 of FIG. 4. Similarly, with the reception of the interest packets that request "uk/aaa/videoB.mp413" to "uk/aaa/videoB.mp4/1024", the RN corresponding to the queue of the content "uk/aaa/videoB.mp4" is updated to 1024.

When a count value of the timer corresponding to the queue of the content "uk/aaa/videoB.mp4" has reached the predetermined value (S30 of FIG. 5), the queue management unit 21 determines whether the RN of this queue is equal to or smaller than the threshold of 300 in S31. In the present example, as the RN is 1024, which is larger than the threshold of 300, the queue management unit 21 discards the queue of the content "uk/aaa/videoB.mp4" in S33. That is to say, the queue management unit 21 does not generate and transmit interest packets that request the objects of the content "uk/aaa/videoB.mp4". In the above-described manner, when the window size W of the client apparatus 12 is sufficiently large (larger than the threshold), the advantageous effects of advanced obtainment by the boundary transfer apparatus 2 are small, and thus the boundary transfer apparatus 2 does not obtain the objects in advance.

Next, a description is given of a case where the client apparatus 12 obtains a content with a content name "uk/aaa/videoC.mp4". It is assumed that this content has been divided into 10000 objects, and their object names are "uk/aaa/videoCmp4/1" to "uk/aaa/videoC.mp4/10000". It is also assumed that "uk/aaa/videoC.mp4/1" to "uk/aaa/videoC.mp4/4000" have been cached in a transfer apparatus within the local network 4, and the client apparatus 12 has already obtained "uk/aaa/videoC.mp4/1" to "uk/aaa/videoC.mp4/4000" from the local network 4. It is also assumed that, consequently, the window size W of the client apparatus 12 is a value corresponding to the throughput in previous obtainment of contents, for example, 1024. Note, it is assumed that all transfer apparatuses that exist between the client apparatus 12 and the server apparatus 3 have cached none of "uk/aaa/videoC.mp4/4001" to "uk/aaa/videoCmp4/10000". Moreover, it is assumed that a threshold held in the queue management unit 21 is 300, and a predetermined value X is 150.

As the window size W=1024, the client apparatus 12 continuously transmits 1024 interest packets that request "uk/aaakideoC.mp4/4001" to "uk/aaa/videoC.mp4/5024". Each interest packet is to be transferred and is to undergo high-speed processing by the boundary transfer apparatus 2 and is thus transmitted to the queue management unit 21. Although the queue management unit 21 receives the interest packet that requests "uk/aaa/videoC.mp4/4001", as the object number of the requested object is 1001, which is larger than the threshold of 300, no queue is generated (S22). In the above-described manner, the window size W of a client apparatus that requests an object larger than the threshold is normally sufficiently large, in which case the advantageous effects of advanced obtainment by the boundary transfer apparatus 2 are small, and thus the boundary transfer apparatus 2 does not obtain the objects in advance.

Note that in the present embodiment, the processing unit 22 determines whether an interest packet is to undergo high-speed processing based on an object name requested by the interest packet. More specifically, a status in which an object name requested by an interest packet indicates a country other than Japan is used as one of the conditions for undergoing high-speed processing. However, a status in which the name indicates a certain predetermined region instead of a country name may be used as one of the conditions for undergoing high-speed processing. Furthermore, rather than using an object name, a status in which an interface that serves as a transfer destination as indicated by the FIB is a predetermined interface may be used as one of the conditions for undergoing high-speed processing. This predetermined interface is, for example, an interface connected to a communication link with a transmission delay equal to or larger than a predetermined value.

Furthermore, the processing unit 22 which operates as a transfer apparatus and the queue management unit 21 which obtains objects in advance for increasing the download speed may be realized as individual apparatuses.

Figure 6:
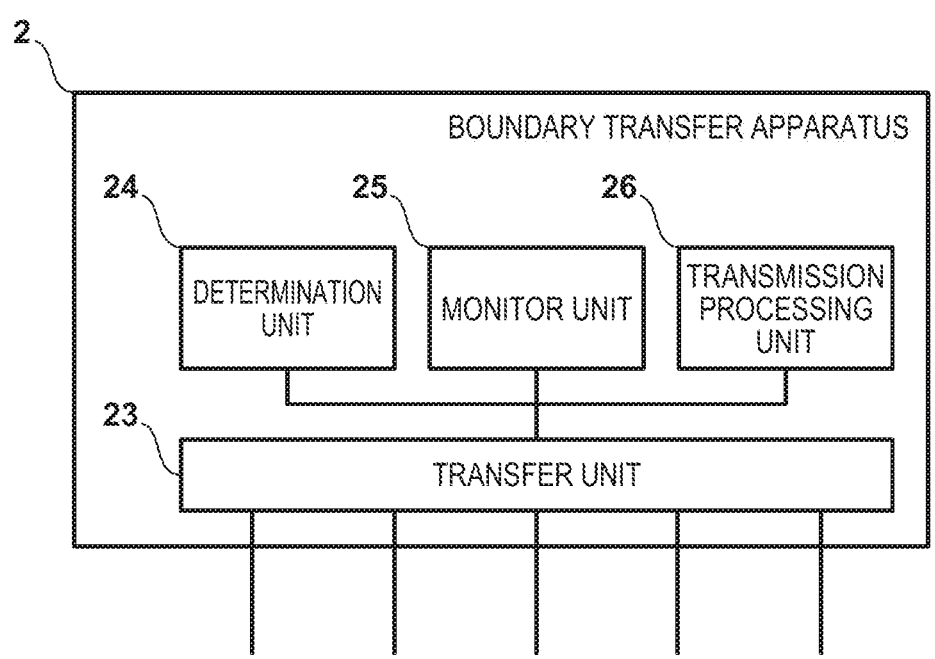
FIG. 6 is a configuration diagram of a boundary transfer apparatus according to an embodiment.

FIG. 6 is another configuration diagram of the boundary transfer apparatus according to the present embodiment. Similar to a normal transfer apparatus, a transfer unit 23 manages FIB, FIT, and CS, and manages transferring and caching of interest packets and data packets.

A determination unit 24 monitors interest packets and determines whether the interest packets are to undergo high-speed processing. The determination unit 24 can use a status in which a requested object of an interest packet has not been cached in the transfer unit 23 and the reception of the requested object is not pending as one of the conditions for determining that the interest packet is to undergo high-speed processing. Also, the determination unit 24 can use a status in which a communication link (an interface) that serves as a transfer destination of an interest packet is a predetermined communication link (a predetermined interface) as one of the conditions for determining that the interest packet is to undergo high-speed processing. Furthermore, the determination unit 24 can determine the installation location of a server apparatus that releases a content corresponding to a requested object of an interest packet based on the object name of the requested object, and use a status in which the determined installation location is within a predetermined region (a predetermined installation location) as one of the conditions for determining that the interest packet is to undergo high-speed processing. Moreover, the determination unit 24 can use a status in which a requested object of an interest packet is one of a plurality of objects obtained by dividing one content and does not represent one content per se as one of the conditions for determining that the interest packet is to undergo high-speed processing. In addition, the determination unit 24 can use a status in which the object number of a requested object of an interest packet is smaller than the predetermined value as one of the conditions for determining that the interest packet is to undergo high-speed processing. Note that the object number of the requested object corresponds to, for example, the time order of the requested object within a content.

When the determination unit 24 determines that a certain interest packet is to undergo processing, a monitor unit 25 determines a content corresponding to a requested object of this interest packet, and monitors subsequent interest packets that request objects of this content for a predetermined period. It is assumed that in the following description, the content corresponding to the requested object of the interest packet that is to undergo processing is referred to as a requested content. Furthermore, the subsequent interest packets which are monitored by the monitor unit 25 during the predetermined period and which request the objects of the requested contents are referred to as monitored interest packets.

When the monitored interest packets satisfy a predetermined condition, a transmission processing unit 26 generates one or more interest packets that request a predetermined number of objects of the requested content (hereinafter, high-speed interest packets), and outputs them to a transfer unit 26. It is assumed that the objects that the high-speed interest packets request are objects that differ from the requested objects and the objects that the monitored interest packets request. For example, the objects that one or more high-speed interest packets request can be objects with object numbers that are larger than the largest value of the object numbers of the requested objects and the objects that the monitored interest packets request. For example, the objects that one or more high-speed interest packets request can be objects from an object number obtained by adding one to the largest value of the object numbers of the requested objects and the objects that the monitored interest packets request to an object number obtained by adding a predetermined value to the largest value.

Note that it is possible to adopt a configuration in which the predetermined condition is satisfied when the largest value of the object numbers of the requested objects of the monitored interest packets is smaller than a threshold. It is also possible to adopt a simpler configuration in which the predetermined condition is satisfied when the number of the monitored interest packets is smaller than a threshold.

Furthermore, the boundary transfer apparatus 2 according to the present invention can be realized by an apparatus having one or more processors, and one or more memories that store programs. The programs, when executed by one or more processors, cause the apparatus to execute the above-described operations of the boundary transfer apparatus 2. These computer programs can be delivered either in a state where they are stored in a non-transitory computer-readable storage medium, or via a network.

The present invention is not limited to the above embodiment and various changes and modifications can be made within the spirit and scope of the present invention. Therefore, to apprise the public of the scope of the present invention, the following claims are made.

What is claimed is:

1. A transfer apparatus for a content distribution network in which a content is divided into one or more objects and distributed, the transfer apparatus comprising:
   one or more processors; and
   one or more memories storing programs, which when executed by the one or more processors, cause the one or more processors to:
   determine, upon receiving a first request packet that requests an object, whether to process the first request packet based on one or more conditions;
   in response to determining that the first request packet is to be processed, (i) determine a requested content corresponding to the object requested by the first request packet, and (ii) monitor one or more second request packets, wherein each second request packet requests an object of the content for a predetermined period;
   determine whether or not the one or more second request packets satisfy a predetermined condition; and
   in response to determining that the one or more second request packets satisfy the predetermined condition, generate and transmit third request packets, wherein each third request packet requests an object of the content, the object requested by each third request packet being different from the objects requested by the first request packet and the one or more second request packets,
   wherein the predetermined condition includes a condition that a number of the one or more second request packets received during the predetermined period is smaller than a threshold.

2. The transfer apparatus according to claim 1, further comprising
a cache unit configured to cache a transferred object,
wherein one condition for determining whether to process the first request packet is that the cache unit has not cached the requested object and reception of the requested object is not pending.

3. The transfer apparatus according to claim 1, wherein
the transfer apparatus is communicatively connected to a plurality of communication links, and
one condition for determining whether to process the first request packet is that a predetermined communication link among the plurality of communication links serves as a transfer destination of the first request packet.

4. The transfer apparatus according to claim 1, wherein
one condition for determining whether to process the first request packet is that an installation location of a server apparatus configured to release the requested content is a predetermined installation location, the installation location being determined based on a name of the requested object.

5. The transfer apparatus according to claim 1, wherein
one condition for determining whether to process the first request packet is that the content has been divided into a plurality of objects.

6. The transfer apparatus according to claim 1, wherein
the content is divided into one or more objects that have respective object numbers, and
the predetermined condition further includes a condition that a largest value of respective object numbers of objects requested by the one or more second request packets received during the predetermined period is smaller than a threshold.

7. The transfer apparatus according to claim 6, wherein
one condition for determining whether to process the first request packet is that an object number of the requested object is smaller than a predetermined value.

8. The transfer apparatus according to claim 6, wherein
each of the third request packets requests an object with an object number that is larger than a largest value of respective object numbers of the objects requested by the first request packet and the one or more second request packets.

9. The transfer apparatus according to claim 8, wherein
in response to determining that the one or more second request packets satisfy the predetermined condition, the generating and transmitting third request packets is for a predetermined number of the third request packets.

10. The transfer apparatus according to claim 9, wherein
the third request packets request objects with a first object number through a second object number,
the first object number is a number obtained by adding one to a largest value of respective object numbers of the objects requested by the first request packet and the one or more second request packets, and
the second object number is a number obtained by adding the predetermined number to the largest value.

11. The transfer apparatus according to claim 1, wherein
the objects are data packets.

* * * * *